United States Patent

Bush

[15] 3,641,440

[45] Feb. 8, 1972

[54] PROGRAMMED PARAMAGNETIC TUNING RADIO RECEIVER USING LARMOR RESONANCE

[72] Inventor: Henry J. Bush, Rome, N.Y.

[73] Assignee: The United States of America as represented by the Secretary of the Air Force

[22] Filed: Oct. 15, 1970

[21] Appl. No.: 81,030

[52] U.S. Cl. ..............................325/383, 325/467, 325/468, 333/70, 334/4

[51] Int. Cl. ..............................H03j 13/00

[58] Field of Search ..................324/0.5; 325/332, 376, 383, 325/467, 468; 332/52 W; 333/24.1, 24 G, 70, 76, 77, 78; 334/4, 71, 74, 76; 336/30, 233

[56] References Cited

UNITED STATES PATENTS 2,793,360 5/1957 Beaumont............................333/24 G

*Primary Examiner*—Benedict V. Safourek

*Attorney*—Harry A. Herbert, Jr. and James S. Shannon

[57] ABSTRACT

A tunable radiofrequency selector and frequency converter for a radio receiver, particularly a receiver for radio signals that are hopped over a wide band in accordance with a prearranged code or program as a protection against jamming. The device derives its selectivity from the narrow band magnetic resonances associated with atomic particles. A cell containing a suitable magnetic resonance material is subjected to an amplitude modulated magnetic field which results in a frequency modulation of the Larmor resonance of the cell. The frequency modulation gives rise to sideband resonances which are restricted to first order resonances by limiting the modulation index and which may be moved over the reception band by varying the modulating frequency of the magnetic field. When a sideband resonance coincides with the frequency of a received signal in the input circuit of the device all sideband resonances are excited as well as the Larmor resonance corresponding to the steady component of the magnetic field, and energies at these frequencies are coupled into the output circuit of the device. The output circuit contains a band-pass filter passing energy in a narrow band centered on the Larmor frequency but rejecting the sideband energies. Therefore, the output of the device for all received signals lies in a narrow band centered on the Larmor frequency. The field modulating frequency is programmed to shift one of the sideband resonances in synchronism with the frequency hopping program of the transmitter. Wide transmission bands are covered by two magnetic resonance cells, one having its Larmor resonance above and the other below the radiofrequency band and each cell providing sideband sensitivities over one-half of the band. The resulting two Larmor output frequencies are reduced to a single output frequency by beating in a common mixer with a local oscillator frequency fixed at a value midway between the Larmor frequencies.

7 Claims, 9 Drawing Figures

Fig-1

INVENTOR.
HENRY J. BUSH
BY Harry A. Herbert Jr
ATTORNEY
James S. Shannon
AGENT

PATENTED FEB 8 1972 3,641,440

SHEET 2 OF 2

INVENTOR.
HENRY J. BUSH
BY Harry A. Herbert Jr
ATTORNEY
James S. Shannon
AGENT

PROGRAMMED PARAMAGNETIC TUNING RADIO RECEIVER USING LARMOR RESONANCE

BACKGROUND OF THE INVENTION

The invention relates to tunable radio receivers, particularly those designed to receive frequency-hopped signals.

As a protection against jamming, certain radio communication systems cause the transmission frequency to continuously change or hop from one frequency to another in the transmission band in accordance with a prearranged program. This requires that the tuning of the receiver change in accordance with the same program in order to maintain continuous reception. Present tuners for this purpose employ a tunable local oscillator and mixer to convert the received radiofrequency to a fixed intermediate frequency together with tunable radiofrequency resonant circuits ganged to the oscillator tuner to provide the radiofrequency selectivity required for image rejection. If for no other reason, tracking errors require pass bands for the radiofrequency circuits considerably in excess of the signal bandwidth, which results in poor noise rejection at the receiver input.

SUMMARY OF THE INVENTION

The purpose of the invention is to provide a tunable radiofrequency selector and frequency converter for a radio receiver, particularly a receiver for frequency-hopped signals, which has high radiofrequency selectivity and therefore good noise rejection at the receiver input and in which the tracking of the center frequency of the input passband with the local oscillator is inherently accurate and imposes no limitation on the input selectivity of the receiver.

Basically the device derives its selectivity from the narrow band magnetic resonances associated with atomic particles. A cell of a suitable magnetic resonance material is subjected to a steady magnetic field $H_0$ to which is added in the same direction a smaller alternating field $H_2$ of frequency $f_2$ supplied by a tunable local oscillator. The result is a magnetic field amplitude modulated at a frequency $f_2$. The amplitude modulation of the field results in a frequency modulation of the Larmor resonance of the cell which gives rise to first order sideband resonances at $f_0+f_2$ and $f_0-f_2$ in addition to the Larmor resonance at frequency $f_0$ corresponding to the steady component $H_0$ of the field. Higher order sideband resonances are suppressed by limiting the magnitude of the modulation index.

The device is provided with an input circuit comprising a winding having its axis normal to the direction of the magnetic field and an output circuit comprising a winding having its axis normal to both the field direction and the axis of the input winding. The radio signal received by the antenna is applied to the input winding. Either the upper sideband resonance $f_0+f_2$ or the lower sideband resonance $f_0-f_2$ can be positioned at any point in the radiofrequency band by changing the local oscillator frequency $f_2$. When the sideband resonance coincides with the received signal both sideband resonances $f_0\pm f_2$ as well as the Larmor resonance $f_0$ are excited and energies lying in narrow bands centered on these three frequencies are coupled into the output winding. A narrow passband filter in the output circuit passes only the energy in the band centered on $f_0$ so that a constant output frequency is produced for all received signals. If necessary, this frequency may be reduced to an intermediate frequency for application to the intermediate frequency amplifier of a conventional superheterodyne receiver by beating with a fixed frequency local oscillator. When the receiver is used to receive frequency-hopped signals the tuning of the first-mentioned local oscillator is so programmed that the sideband sensitivity follows the prearranged frequency hopping program of the transmitter.

To cover wider radiofrequency bands, two magnetic resonance cells having Larmor resonances lying equal distances above and below the band are used, each cell providing sideband sensitivities over one-half of the band. The resulting two Larmor output frequencies are reduced to a single intermediate frequency by beating in a common mixer with a local oscillator frequency fixed at a value midway between the Larmor frequencies.

DETAILED DESCRIPTION

Figure 1:
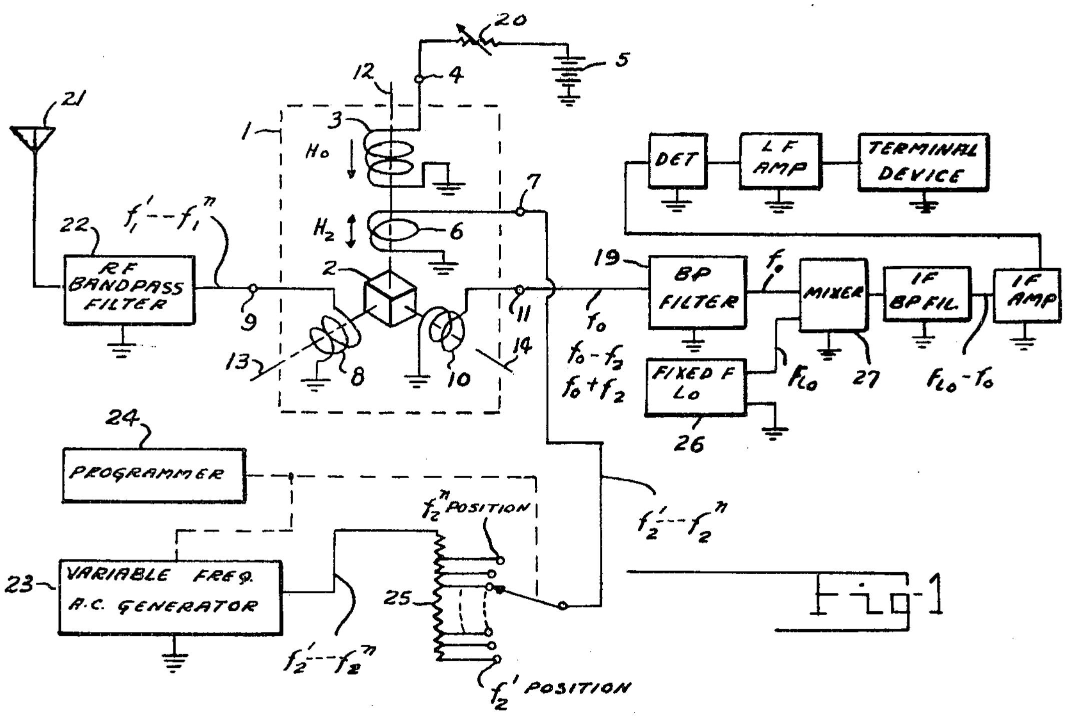
FIG. 1 shows a superheterodyne receiver equipped with a tunable selector and frequency converter in accordance with the invention.

Referring to FIG. 1, which shows a superheterodyne receiver incorporating the invention, the selection of the received radio signal and its conversion to a fixed radiofrequency is accomplished by the MR (magnetic resonance) element 1. This element comprises a cell 2 containing a suitable magnetic resonance material, a winding 3 energized through terminal 4 with constant direct current from source 5 for producing a constant magnetic field $H_0$, a winding 6 energized with alternating current through terminal 7 for producing an alternating magnetic field $H_2$ in the same direction as $H_0$, an input winding 8 connected to an input terminal 9, and an output winding 10 coupled to an output terminal 11. The axes 12, 13 and 14 of the coils are mutually perpendicular and intersect at the center of cell 2. The windings are shown spaced apart for ease of illustration but in actual practice would surround the cell 2 and be centered on the center of the cell.

Magnetic resonance phenomena including the generation of sideband resonances by amplitude modulation of the magnetic field to which the magnetic resonance material is subjected are adequately covered in the literature, examples being the patents to Bloch et al., U.S. Pat. No. Re. 23,950, Feb. 22, 1955, and to Nelson U.S. Pat. No. 3,418,564, Dec. 24, 1968. Briefly, if the material in cell 2 is subjected to a steady magnetic field $H_0$ there is produced a very narrow band or highly selective resonant sensitivity centered on a frequency $f_0$ called the Larmor frequency the value of which depends upon $H_0$ and the gyromagnetic ratio $\gamma$ of the magnetic resonance material in accordance with the relationship $$(1) \qquad f_0=\gamma H_0/2\pi.$$

Figure 4:
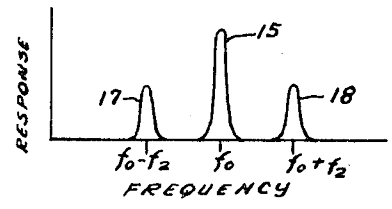
FIG. 4 illustrates the Larmor and sideband resonances.

The gyromagnetic ratio $\gamma$ is a property of the material and has the dimension radians/second/gauss. This resonant sensitivity has a Lorentzian shape and may be represented by curve 15 of FIG. 4. Its effect is that the magnetic resonance material in cell 2 absorbs energy from radiofrequency signals in input winding 8 lying within the bandwidth of curve 15 and induces voltages of the same frequency in output winding 10. Therefore, in effect, device 1, as so far described, acts as a highly selective band-pass filter which passes to output terminal 11 only those signals present at input terminal 9 that lie within the narrow band resonant sensitivity 15.

Figure 3:
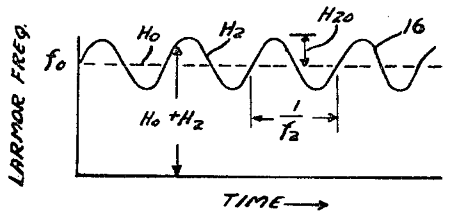
FIG. 3 represents the amplitude modulated magnetic field employed in the magnetic resonance device.

If an alternating magnetic field $H_2$ having a value $$(2) \qquad H_2=H_{20}\cos 2\pi f_2 t,$$

where $H_{20}$ is the maximum amplitude of $H_2$ an is less than $H_0$, is added to the field $H_0$ the result is the subjection of cell 2 to an amplitude modulated magnetic field as represented by curve 16 of FIG. 3. The effect of the amplitude modulation is to produce a frequency modulation of the Larmor resonance about the frequency $f_0$ as also represented by curve 16. The frequency modulation gives rise to first order sideband resonant sensitivities at frequencies $f_0-f_2$ and $f_0+f_2$ as represented by curves 17 and 18 of FIG. 4. Second and higher order sideband resonances are suppressed by limiting the frequency modulation index to the value, approximately 0.26, at and below which the higher order resonances have negligible amplitudes.

The modulation index is defined as the ratio of the maximum frequency shift away from the mean frequency $f_0$ to the modulating frequency $f_2$. From equation (1) the maximum frequency shift is seen to be $\gamma H_{20}/2\pi$. Therefore, the modulation index $m_f$ is given by the equation $$(3) \qquad m_f=\gamma H_{20}/2\pi f_2$$

from which it is apparent that, for a given material and frequency $f_2$, the index is directly proportional to the amplitude $H_{20}$ of the alternating field $H_2$, and that by controlling $H_{20}$ in direct proportion to $f_2$ the value of $m_f$ may be held constant over a range of values of $f_2$. The correct value of $H_{20}$ for a constant modulation index of 0.26 is therefore $$(4) \qquad H_{20}=0.26(2\pi f_2/\gamma).$$

It is a property of the magnetic resonance system 1 that energy in input coil 8 falling within the bandwidth of any of the resonant sensitivities 15, 17 and 18 will excite all three sensitivities and produce signals falling within the bandwidths of resonances 15, 17, and 18 in output winding 10. For example, input signals falling within the bandwidth of the upper sideband resonance 18 will produce in output coil 10 not only signals of corresponding frequencies but also signals of frequencies lying within the passbands defined by curves 15 and 17. The device is therefore a frequency converter in that input energy lying within any of the bands 15, 17, and 18 will produce output energy at frequencies lying in the other bands. Further, by restricting the output to the frequency band represented by curve 15, as by band-pass filter 19, an input lying in one of the sideband resonances 17 and 18 will produce an output from this filter in the fixed passband represented by curve 15.

Figure 6:
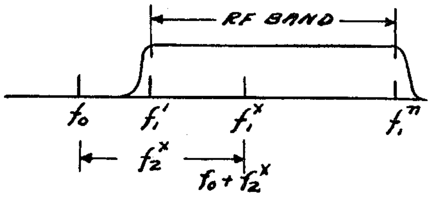
FIG. 6 illustrates the overall operation of the tunable selector and frequency converter of FIG. 1.

In accordance with the invention the above properties are utilized to provide a highly selective tuner and frequency converter for a radio receiver. The operation is illustrated in FIG. 6. For the particular magnetic resonance material used the value of $H_0$ is adjusted, as by variable resistor 20, to place $f_0$ outside the band of radiofrequencies over which the receiver is to be tuned. Tuning is then accomplished by varying $f_2$ over the range required to move one of the sideband resonant sensitivities over the radiofrequency band. In FIG. 6, $f_0$ is set below the RF band and the upper sideband resonant sensitivity $f_0+f_2$ is used for tuning. It could have been set above the RF band and the lower sideband resonance $f_0-f_2$ used.

Figure 2:
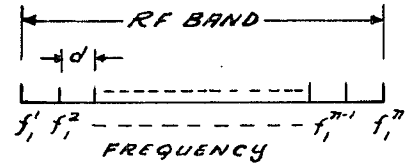
FIG. 2 illustrates a frequency-hopped transmission.

Assuming the previously mentioned hopped frequency method of transmission to be used, the carrier frequency of the signal received by antenna 21 may be hopped in accordance with a prearranged code or program from one to another of a number of discrete carrier frequencies $f_1^1-f_1^n$ having a separation $d$, for example 1 MHz., as illustrated in FIG. 2. Therefore at the receiver there must be a similar program for $f_2$ providing values $f_2^1-f_2^n$ as required to adjust the sideband resonance to the received signal. As illustrated in FIG. 6, if the received signal at any instant has a carrier frequency $f_1^x$, the locally generated frequency $f_2$ must have a corresponding value $f_2^x$ such that $f_0+f_2^x$ equals $f_1^x$. A band-pass filter 22 may be employed between the antenna and input terminal 9 of the magnetic resonance element 1 to limit the signals to those falling within the band $f_1^1-f_1^n$.

Figure 5:
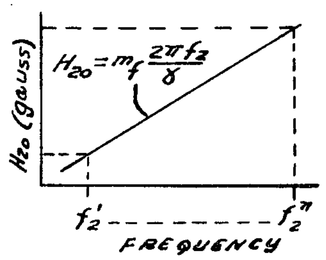
FIG. 5 shows the required relationship between the amplitude $H_{20}$ of the alternating magnetic field $H_2$ and the local oscillator frequency $f_2$ to achieve a constant modulation index of 0.26 for higher order sideband suppression.

Variable frequency generator 23 is controlled by programmer 24 to produce the required locally generated signals $f_2^1-f_2^n$. The $f_2$ program at the receiver must be synchronized with the $f_1$ program at the transmitter in order to permit continuous reception of the transmitted signal. Methods for effecting the synchronization used in present frequency-hopped communication systems may be used here, this part of the communication system not being a part of the invention. As stated earlier, the modulation index $m_f$ is held at a value of approximately 0.26 in order to provide the greatest amplitude of the first-order sideband resonances possible without increasing the higher order sideband amplitudes above insignificant levels. As seen in equations (3) and (4) and as illustrated in FIG. 5, a constant modulation index requires that the maximum amplitude $H_{20}$ of the alternating component of the magnetic field be a linear function of $f_2$. This relationship is accomplished by an attenuator comprising a tapped resistor 25 actuated by programmer 24 along with the $f_2$ generator 23 for controlling the current in winding 6 and thereby the value of $H_{20}$. Resistor 25 is so designed that the resistance introduced into the circuit at each tap provides the correct value of $H_{20}$ for the value $f_2$ corresponding to the tap as required by the linear relationship between these two quantities illustrated in FIG. 5. Where the frequency $f_2$ is too high for the satisfactory operation of a tapped resistor as an attenuator, other types of RF attenuators suitable for the higher frequencies may be used. Also, any other method of controlling the magnitude of $H_{20}$, such as a variable gain amplifier may be used.

The frequency $f_0$ will normally be higher than the intermediate frequency of the superheterodyne receiver. It may be reduced to the intermediate frequency by the use of the fixed frequency local oscillator 26 and mixer 27. The remainder of the receiver follows conventional superheterodyne practice.

Figure 7:
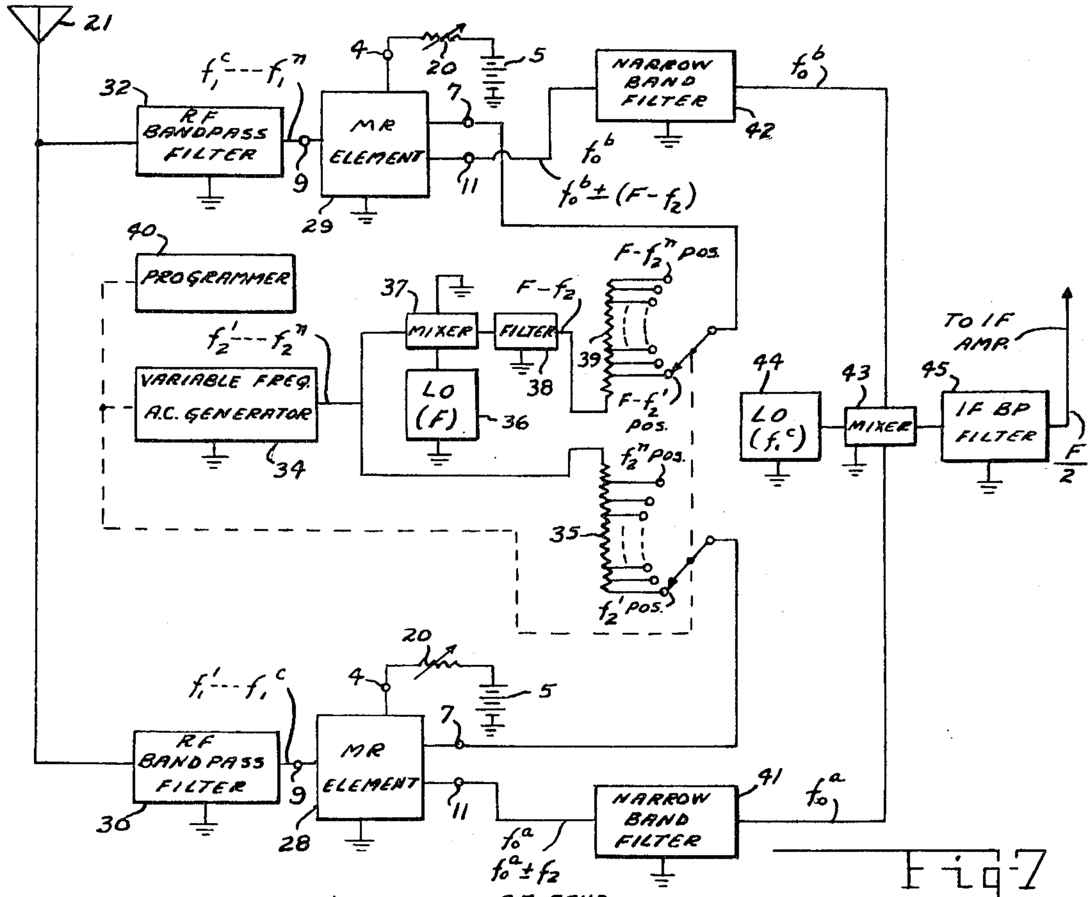
FIG. 7 shows a circuit arrangement of two magnetic resonance elements for increasing the tuning range of the receiver.
Figure 8:
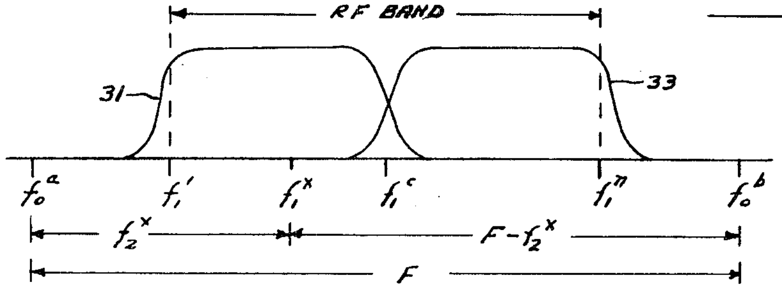
FIG. 8 illustrates the operation of FIG. 7.

FIG. 7 shows an embodiment of the invention employing two magnetic resonance elements 28 and 29, each like element 1 of FIG. 1, for doubling the tuning range or the RF band over which radio signals may be received. The operation of FIG. 7 is illustrated in FIG. 8. It will be assumed again that the receiver is to be used in a frequency-hopped system in which the transmitter carrier frequency hops from one to another of the discrete values $f_1^1-f_1^n$ in accordance with a prearranged program. Therefore, the RF band may again be represented by FIG. 2, although the frequency range or bandwidth may be twice as great as was possible in FIG. 1 and $n$ may be a larger integer. As seen in FIG. 8, the tuning range or RF transmission band is divided into two equal contiguous bands $f_1^1-f_1^c$ and $f_1^c-f_1^n$, $f_1^c$ being at the center of the tuning range. The magnetic resonance element 28 operates over the lower band $f_1^1-f_1^c$, its RF input at terminal 9 being substantially limited to this band by band-pass filter 30 the transmission characteristic of which is represented by curve 31. Similarly, magnetic resonance element 29 operates over the upper band $f_1^c-f_1^n$, its RF input being substantially limited to this band by band-pass filter 32 represented by curve 33. By proper adjustment of resistor 20 in each case, the Larmor resonance $f_0^a$ of element 28 and the Larmor resonance $f_0^b$ of element 29 are made to fall outside and equally below and above the RF band such that $$(5) \qquad f_1^1-f_0^a=f_0^b-f_1^n$$

as illustrated in FIG. 8.

As in FIG. 1, sideband resonant sensitivities are produced by magnetic resonance element 28 through application of current of frequency $f_2$ to terminal 7. This current is generated by variable frequency generator 34 and is controlled in amplitude by tapped resistor 35 for holding the modulation index at 0.26 and the sideband resonances to first order resonances as in FIG. 1. Generator 34 is capable of producing any of the discrete values $f_2^1-f_2^n$ of $f_2$ as required to bring the upper sideband sensitivity produced by element 28 into coincidence with a received signal having any of the discrete frequencies $f_1^1-f_1^n$. Thus, as seen in FIG. 8, the upper sideband resonant sensitivity $f_0^a+f_2^x$ of element 28 may be brought into coincidence with a received signal $f_1^x$ falling at any point in the RF band.

It is also arranged in FIG. 7 that for all values of $f_2$ the lower sideband sensitivity of element 29 coincides with the upper sideband sensitivity of element 28 and with the received signal $f_1^x$. This is accomplished by applying to terminal 7 of element 29 current of frequency $F-f_2$ where $F$ is the difference in the Larmor frequencies of the two magnetic resonance elements, or $$(6) \qquad F=f_0^b-f_0^a.$$

The frequency $F-f_2$ is derived from the $f_2$ output of generator 34 by intermodulation of the frequency $f_2$, which may have any of the values $f_2^1-f_2^n$, with the fixed frequency $F$ derived from local oscillator 36 in mixer 37, and selecting the frequencies $F-f_2$ from the resulting modulation products by a suitable band-pass filter 38. Tapped resistor 39 performs the same function as resistor 35 in holding the modulation index at 0.26. However, due to the complementary nature of $f_2$ and $F-f_2$, these attenuators must operate inversely, i.e., 39 must produce minimum attenuation when 35 is producing maximum attenuation, as shown in FIG. 7. Both attenuators and generator 34 are controlled by programmer 40 to synchronize the receiver tuning with the hopped transmission frequency. Again, other types of RF attenuators or a variable gain amplifier may be used instead of the tapped resistor 35 or 39.

As in FIG. 1, the Larmor output frequencies $f_0^a$ and $f_0^b$ are selected from the outputs of magnetic resonance elements 28 and 29 by band-pass filters 41 and 42. Each of these frequencies is reduced to a common frequency $F/2$ by intermodulation in mixer 43 with the frequency $f_1^c$ of local oscillator 44 and selecting from the modulation product by means of band-pass filter 45 the frequencies lying in a narrow band centered on $F/2$. The frequency of $f_1^c$ is the center frequency of the RF band and also midway between the two Larmor frequencies $f_0^a$ and $f_0^b$. Therefore, $$f_1^c-f_0^a=f_0^b-f_1^c=F/2. \quad (7)$$

The output of filter 45 may be applied directly to the IF amplifier in FIG. 1.

As explained above, the upper sideband sensitivity of magnetic resonance element 28 and the lower sideband sensitivity of element 29 coincide throughout the entire RF band. However, due to filters 30 and 31, magnetic resonance element 28 receives no input and is not excited in the upper half $f_1^c-f_1^n$ of the band and similarly element 29 is not excited in the lower half $f_1^L-f_1^c$ of the band, except in the small region of overlap of the filters in the vicinity of $f_1^c$. In this region both magnetic resonance elements produce outputs which add together in the output of mixer 43 to produce the final output.

Figure 9:
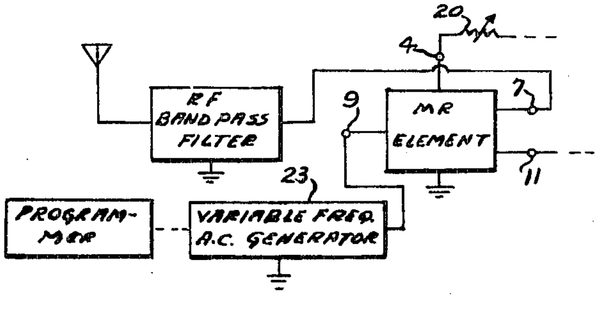
FIG. 9 shows an alternative form of the invention.

In both FIG. 1 and FIG. 7 the input radiofrequency has been applied through terminal 9 to winding 8 and the frequency $f_2$, or tuning frequency, which produces the variable frequency sideband sensitivities, has been applied through terminal 7 and winding 3. These roles may be reversed as shown in FIG. 9. In this case the received radiofrequency modulates the magnetic field and produces the sideband sensitivities which are activated by the variable frequency output of generator 23.

The type of magnetic resonance employed, i.e., nuclear magnetic resonance (NMR) or electron magnetic resonance (EMR), and the magnetic resonance material used in any particular case depend upon such parameters as frequency, frequency range, and minimum bandwidth of the resonant sensitivity, some materials producing a sharper resonance or narrower bandwidth than others. The following table gives several examples:

| Material | $\gamma/2\pi$ | Range | Minimum bandwidth |
|---|---|---|---|
| NMR: | | | |
| $Hg^{199}$ | .8 kHz./g | 10 Hz.–30 MHz | .01 Hz. |
| $Hg^{201}$ | .3 kHz./g | 10 Hz.–10 MHz | 1 Hz. |
| $H^1$ in $H_2O$ | 4.2 kHz./g | 100 Hz.–60 MHz | 1 Hz. |
| EMR: | | | |
| Cs | .35 MHz./g | 1 kHz.–10 gHz. | 10 Hz. |
| $Rb^{85}$ | .70 MHz./g | 1 kHz.–10 gHz | 10 Hz. |
| He(metastable) | 2.8 MHz./g | 10 kHz.–10 gHz | 1 kHz. |
| YIG (sphere) | 2.8 MHz./g | 100 MHz.–20 gHz | 2 MHz. |

While the specific embodiments of the invention described have been for use in a frequency-hopped radio communication system as an example, the invention is not limited to such use. It is equally applicable to continuously tunable receivers in which case $f_2$ is continuously varied rather than being made to assume discrete values as in the frequency-hopped receivers described.

I claim:

1. In a radio receiver having an antenna for receiving radio signals with carrier frequencies in a given radiofrequency band and a fixed frequency amplifier for amplifying signals having a fixed carrier frequency, apparatus tunable over said radio frequency band for selecting any radio signal in said band received by said antenna and for converting said received signal to a signal at a fixed carrier frequency for application to said fixed frequency amplifier, said apparatus comprising: a cell of magnetic resonance material; means subjecting said cell to a continuous unidirectional magnetic field having an alternating modulation and having a mean value which places the Larmor resonant sensitivity of the magnetic resonance material corresponding to said mean value outside said radiofrequency band, the modulation of said field inherently producing frequency modulation sideband resonant sensitivities separated from said Larmor resonant sensitivity by multiples of the field modulation frequency; input and output windings having said cell in their magnetic fields, the axes of said windings being normal to each other and to the direction of said modulated field; means coupling said antenna to the input winding; a filter passing a narrow band of frequencies centered on the frequency of said Larmor resonant sensitivity coupled between the output winding and said fixed frequency amplifier; and means for varying the frequency of said alternating modulation over a range such that one of said sideband sensitivities traverses said radiofrequency band.

2. Apparatus as claimed in claim 1 in which the carrier frequency of the received radio signal hops from one to another of a plurality of discrete carrier frequencies within said radiofrequency band in accordance with a prearranged program and in which there is provided at the receiver a programmer coupled to the means for varying the frequency of the alternating modulation for adjusting the instantaneous modulation frequency to a value such that said one sideband sensitivity is centered on the instantaneous carrier frequency of the received radio signal.

3. Apparatus as claimed in claim 1 in which there is provided means coupled to and operated in conjunction with the said means for varying the alternating modulation frequency for varying the amplitude of said alternating modulation in direct proportion to the alternating modulation frequency for holding the frequency modulation index associated with said Larmor and frequency modulation sideband resonant sensitivities at a value for which only the first-order sideband resonances have significant magnitude.

4. Apparatus as claimed in claim 3 in which the said one of said sideband sensitivities is a first-order sideband sensitivity and in which the carrier frequency of the received radio signal hops from one to another of a plurality of discrete carrier frequencies within said radiofrequency band in accordance with a prearranged program and in which there is provided at the receiver a programmer coupled to the means for varying the frequency of the alternating modulation for adjusting the instantaneous modulation frequency to a value such that said first order sideband sensitivity is centered on the instantaneous carrier frequency of the received radio signal.

5. Apparatus as claimed in claim 1 and in addition: a second cell of magnetic resonance material having associated input and output windings like the first-named cell; means coupling the input winding of the second cell to said antenna; means subjecting said second cell to a continuous unidirectional magnetic field having an alternating modulation and having a mean value such as to place the Larmor resonant sensitivity of the magnetic resonance material corresponding to said mean value an equal distance outside and on the opposite side of said radiofrequency band relative to the Larmor resonant sensitivity of the first-named cell, the modulation of the field, as in the case of the first-named cell, inherently producing frequency modulation sideband resonant sensitivities separated from the Larmor resonant sensitivity of the second cell by multiples of the field modulation frequency, means for establishing the frequency of the alternating modulation of the field of the second cell at a value equal to the different in the frequencies of the Larmor resonant sensitivities of the two magnetic resonance cells minus the field modulation frequency of the first-named cell; a filter passing a narrow band of frequencies centered on the frequency of the Larmor resonant sensitivity of the second cell coupled between the output winding of the second cell and said fixed frequency amplifier; and means interposed between the filters coupled to the output windings of the first-named and second cells and said fixed frequency amplifier for deriving a fixed carrier frequency signal for application to said fixed frequency amplifier having a frequency equal to the difference between the frequency of the said Larmor resonant sensitivity of each cell and the mid-frequency of said radiofrequency band.

6. Apparatus as claimed in claim 5 in which a band-pass filter passing the lower half of said radiofrequency band is interposed between said antenna and the input winding for the first-named cell, and a band-pass filter passing the upper half of said radiofrequency band is interposed between said antenna and the input winding for said second cell.

7. Apparatus as claimed in claim 6 in which there are provided separate means coupled to and operated in conjunction with the said means for varying the alternating modulation frequency of the first-named cell for varying the amplitude of the alternating modulation of the magnetic field for each of said cells in direct proportion to the alternating modulation frequency for that cell for holding the frequency modulation index associated with the Larmor and frequency modulation sideband resonant sensitivities for each cell at a value for which only first-order sideband resonances have significant magnitude.

* * * * *